(12) United States Patent
Hwang

(10) Patent No.: US 8,678,423 B1
(45) Date of Patent: Mar. 25, 2014

(54) TOWING HOOK ASSEMBLY FOR VEHICLE

(71) Applicant: Hyundai Motor Company, Seoul (KR)

(72) Inventor: Changsup Hwang, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/709,837

(22) Filed: Dec. 10, 2012

(30) Foreign Application Priority Data

Oct. 26, 2012 (KR) .................. 10-2012-0119946

(51) Int. Cl.
*B60D 1/14* (2006.01)
(52) U.S. Cl.
USPC ........... 280/495; 280/500; 280/501; 280/502; 280/503; 280/504; 280/505
(58) Field of Classification Search
USPC .................................................. 280/500–505
See application file for complete search history.

(56) References Cited

U.S. PATENT DOCUMENTS

| | | | | | |
|---|---|---|---|---|---|
| 1,739,986 | A | * | 12/1929 | Reid | 280/504 |
| 2,591,487 | A | * | 4/1952 | Wirz | 280/504 |
| 2,894,763 | A | * | 7/1959 | Karnath et al. | 280/421 |
| 3,863,956 | A | * | 2/1975 | Khan | 280/483 |
| 4,610,458 | A | * | 9/1986 | Garnham | 280/495 |
| 5,716,066 | A | * | 2/1998 | Chou et al. | 280/501 |
| 6,402,179 | B1 | * | 6/2002 | Morris et al. | 280/495 |
| 6,626,450 | B2 | * | 9/2003 | Braun et al. | 280/500 |
| 6,979,016 | B1 | * | 12/2005 | Wegener | 280/505 |
| 7,472,919 | B2 | * | 1/2009 | Pratt et al. | 280/480.1 |
| 8,246,069 | B2 | * | 8/2012 | Ladzinski et al. | 280/495 |
| 8,308,184 | B2 | * | 11/2012 | Hodoya et al. | 280/495 |
| 2012/0091691 | A1 | * | 4/2012 | Leinenger | 280/504 |

FOREIGN PATENT DOCUMENTS

| | | |
|---|---|---|
| JP | 2001-180240 (A) | 7/2001 |
| KR | 10-2005-0032382 A | 4/2005 |
| KR | 10-2007-0059596 A | 6/2007 |
| KR | 1020110058469 (A) | 6/2011 |
| KR | 1020110072899 (A) | 6/2011 |

* cited by examiner

*Primary Examiner* — J. Allen Shriver, II
*Assistant Examiner* — Conan Duda
(74) *Attorney, Agent, or Firm* — Morgan, Lewis & Bockius LLP

(57) ABSTRACT

A towing hook assembly for a vehicle disposed in a bumper unit may include a stay connected to both distal rear sides of a bumper beam, a towing hook pipe provided at one inner side of the stay through the bumper beam, and a supporting member supporting an exterior circumference of the towing hook pipe, and connected to an interior circumference of the stay.

6 Claims, 5 Drawing Sheets

TOWING HOOK ASSEMBLY FOR VEHICLE

CROSS-REFERENCE TO RELATED APPLICATION

The present application claims priority to Korean Patent Application No. 10-2012-0119946 filed on Oct. 26, 2012, the entire contents of which is incorporated herein for all purposes by this reference.

BACKGROUND OF THE INVENTION

1. Field of the Invention

The present invention relates to a towing hook assembly for a vehicle. More particularly, the present invention relates to a towing hook assembly for a vehicle for ensuring a collision strength of a bumper beam for head-on collision of the vehicle and durability for a hauling load.

2. Description of Related Art

In general, a towing hook device for a vehicle connects a cable to a vehicle body so that the vehicle is rescued or hauled or connects a trailer to be hauled. Particularly, a towing hook device for hauling a passenger car or the like generally includes a towing hook pipe provided at a bump beam and a towing hook is coupled with the towing hook pipe such that the towing hook device is used.

Meanwhile, the towing hook pipe is welded and fixed to one side of the bumper beam. A method of assembling a towing hook pipe according to the related art forms an assemble hole at one side of the bumper beam, and welds a towing hook pipe and a mounting bracket to a rear surface of the bumper beam in a state that the towing hook pipe is inserted into the assemble hole.

However, since the bumper beam in which the towing hook device according to the related art as described above is mounted may not have a sufficient strength for a load applied upon hauling the vehicle, and may be damaged. Further, upon heading-on collision of the vehicle, the bumper and a stay does not perform an original function which is transformed to absorb collision energy. As the bumper beam is rotated upward, a collision load may be not normally transferred and the collision energy may not be sufficiently absorbed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a towing hook assembly for a vehicle having advantages of improving the durability to have a sufficient strength for a load applied to a bumper beam upon hauling of the vehicle, improving a transfer of a collision load and an absorption force of collision energy, and increasing a collision strength of the bumper beam by guiding stable transformation of the bumper beam and a stay upon heading-on of the vehicle.

In an aspect of the present invention, a towing hook assembly for a vehicle disposed in a bumper unit may include a stay connected to both distal rear sides of a bumper beam, a towing hook pipe provided at one inner side of the stay through the bumper beam, and a supporting member supporting an exterior circumference of the towing hook pipe, and connected to an interior circumference of the stay.

An insertion hole is formed to the bumper cover and the towing hook pipe is provided at the one inner side of the stay through the insertion hole of the bumper beam.

The supporting member may have a plate shape.

The supporting member may include a pipe connector having a half circle shape and connected to an exterior circumference of the towing hook pipe, and a stay connector connected to an interior circumference of the stay at a remaining edge except for the pipe connector, wherein the pipe connector is connected to the stay connector.

The stay may include a first stay and a second stay connected to the first stay, wherein the stay connector is connected to the interior circumference of the first stay and the second stay.

First and second mounting surfaces connected to both sides of the interior circumference of the stay, respectively, are integrally formed on the stay connector.

Third and fourth mounting surfaces connected to upper and lower sides of the interior circumference of the stay, respectively, are integrally formed on the stay connector.

A reinforcing groove protrudes in a direction of the bumper beam in the supporting member.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
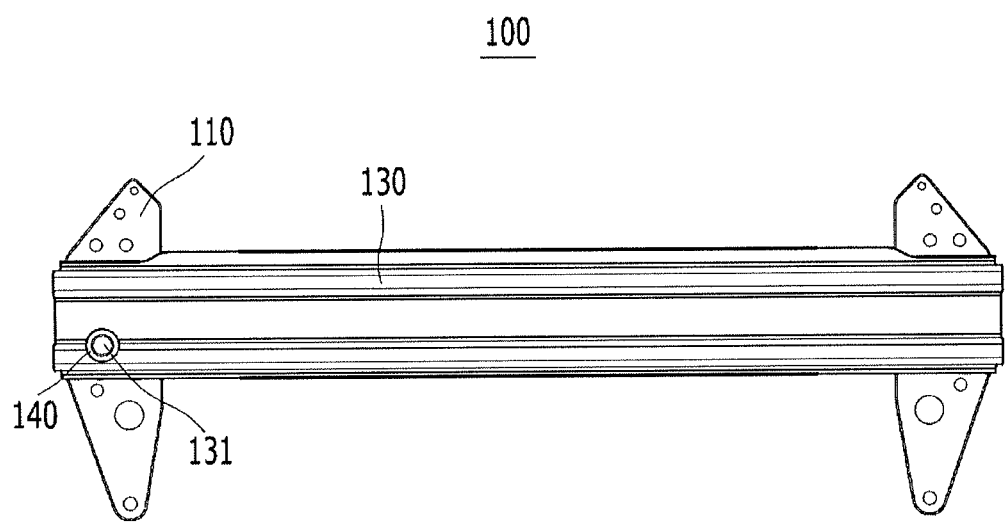
FIG. 1 is a front view illustrating a towing hook assembly for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described more fully hereinafter with reference to the accompanying drawings, in which exemplary embodiments of the invention are shown. However, the present invention may be modified in various different ways, not limited to the exemplary embodiment described herein.

Parts irrelevant to a description are omitted to clearly illustrate the present invention, and like reference numbers designate like constituent elements through the specification.

Further, the size and thickness of each configuration shown in the drawings are optionally illustrated for better understanding and ease of description, the present invention is not limited to shown drawings, the thickness is exaggerated for clarity of a plurality of parts and regions.

FIG. 1 is a front view illustrating a towing hook assembly for a vehicle according to an exemplary embodiment of the present invention.

Referring to FIG. 1, the towing hook assembly 100 for a vehicle according to the exemplary embodiment of the present invention includes a structure which has a sufficient strength for a load applied to a bumper beam 130 upon hauling of the vehicle so that the durability may be improved by applying a reinforcing member inside a stay 120.

Further, the towing hook assembly 100 for a vehicle according to an exemplary embodiment of the present invention includes a structure which improves a transfer of a collision load and an absorption force of collision energy and increases a collision strength of the bumper beam 130 by guiding stable transformation of the bumper beam 130 and the stay 120 upon heading-on of the vehicle.

Figure 2:
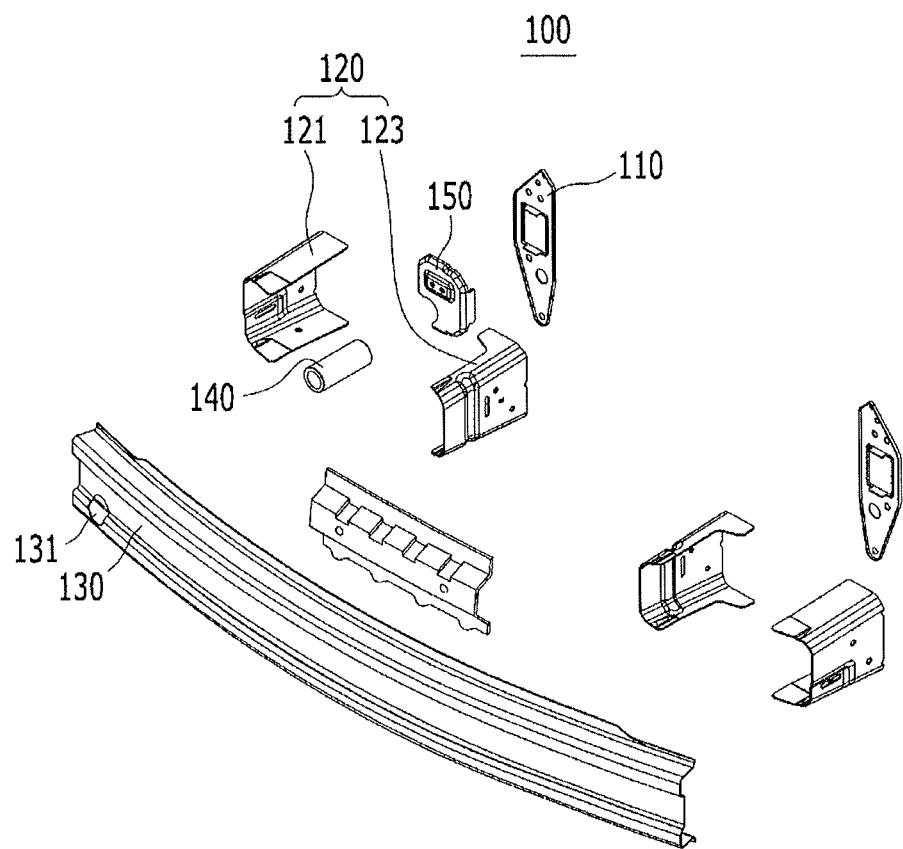
FIG. 2 is an exploded perspective view illustrating a towing hook assembly for a vehicle according to the exemplary embodiment of the present invention.
Figure 3:
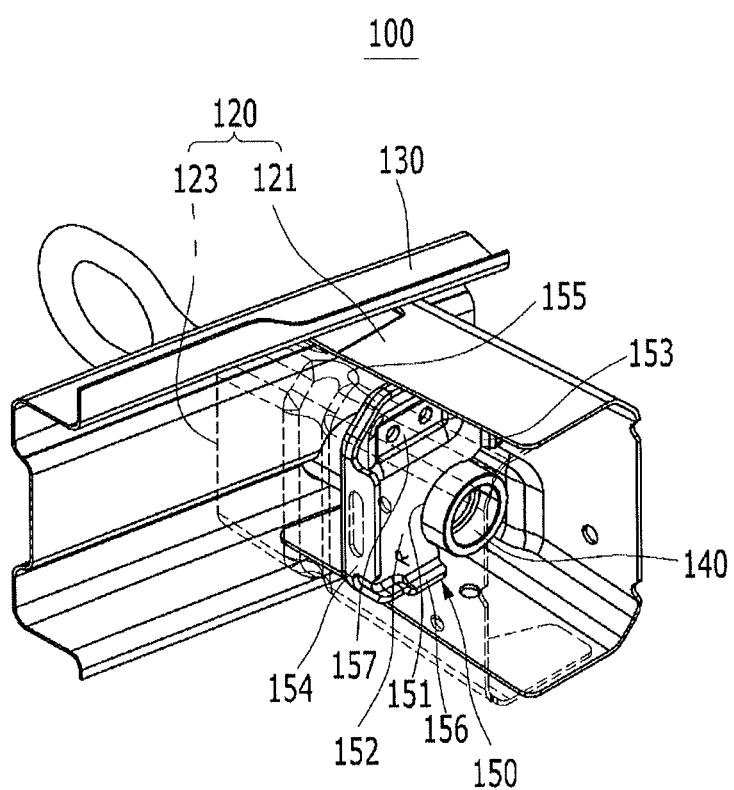
FIG. 3 is a perspective view illustrating a rear side of the towing hook assembly for a vehicle according to the exemplary embodiment of the present invention.
Figure 4:
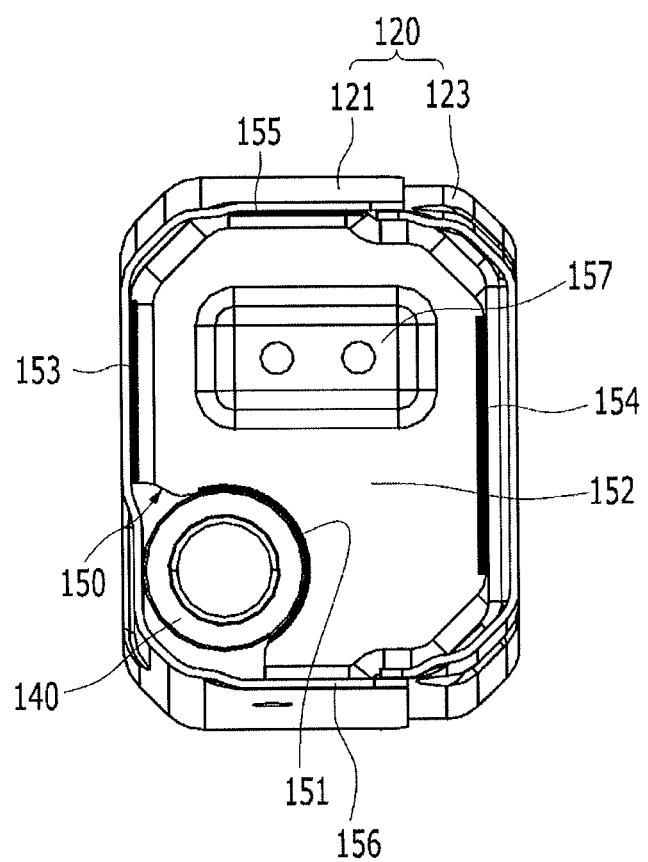
FIG. 4 is a cross-sectional view taken along line A-A of FIG. 3.

FIG. 2 is an exploded perspective view illustrating a towing hook assembly for a vehicle according to the exemplary embodiment of the present invention, FIG. 3 is a perspective view illustrating a rear side of the towing hook assembly for a vehicle according to the exemplary embodiment of the present invention, and FIG. 4 is a cross-sectional view taken along line A-A of FIG. 3.

Referring to FIGS. 2 to 4, the towing hook assembly 100 for a vehicle according to an exemplary embodiment of the present invention includes the stay 120, the bumper beam 130, a towing hook pipe 140, and a supporting member 150, and respective constituent elements will be described as follows.

First, a rear end of the stay 120 is connected to mounting plates 110 which are coupled with both sides of a front side of a vehicle body, respectively, and the stay 120 may include a first stay 121 and a second stay 123.

Here, the first stay 121 may be coupled to surround an exterior circumference of the second stay 123.

The bumper beam 130 is disposed in a width direction of the vehicle, and both sides of the bumper beam 130 are connected to a front end of the stay 120, respectively.

The towing hook pipe 140 is provided an inner side of the stay 120 through an insertion hole 131 which is formed at a side of the bumper beam 130.

In an exemplary embodiment of the present invention, the supporting member 150 supports an exterior circumference of the towing hook pipe 140, and is connected to an interior circumference of the stay 120.

The supporting member 150 may include a pipe connector 151 and a stay connector 152.

The pipe connector 151 has a half shape to be connected to the exterior circumference of the towing hook pipe 140.

The stay connector 152 is connected to the interior circumference of the stay 120 at a remaining edge except for the pipe connector 151.

Here, the first and the second mounting surfaces 153 and 154 welded to both sides of the interior circumference of the stay 120, respectively, are integrally formed on the stay connector 152. Moreover, the third and the fourth mounting surfaces 155 and 156 welded to upper and lower sides of the interior circumference of the stay 120, respectively, are integrally formed on the stay connector 152.

The first, second, and third and the fourth mounting surfaces 153, 154, 155, and 156 are mounted on the interior circumference of the stay 120 through $CO_2$ welding.

In addition, a reinforcing groove 157 protrudes in a direction of the bumper beam 130 in the supporting member 150. The reinforcing groove 157 is formed to improve the durability and the collision strength inside the stay 120 upon hauling or collision of the vehicle. Meanwhile, the supporting member 150 may have a plate shape.

Hereinafter, assembling of a towing hook assembly 100 for a vehicle according to an exemplary embodiment of the present invention will be described with reference to FIG. 5.

Figure 5:
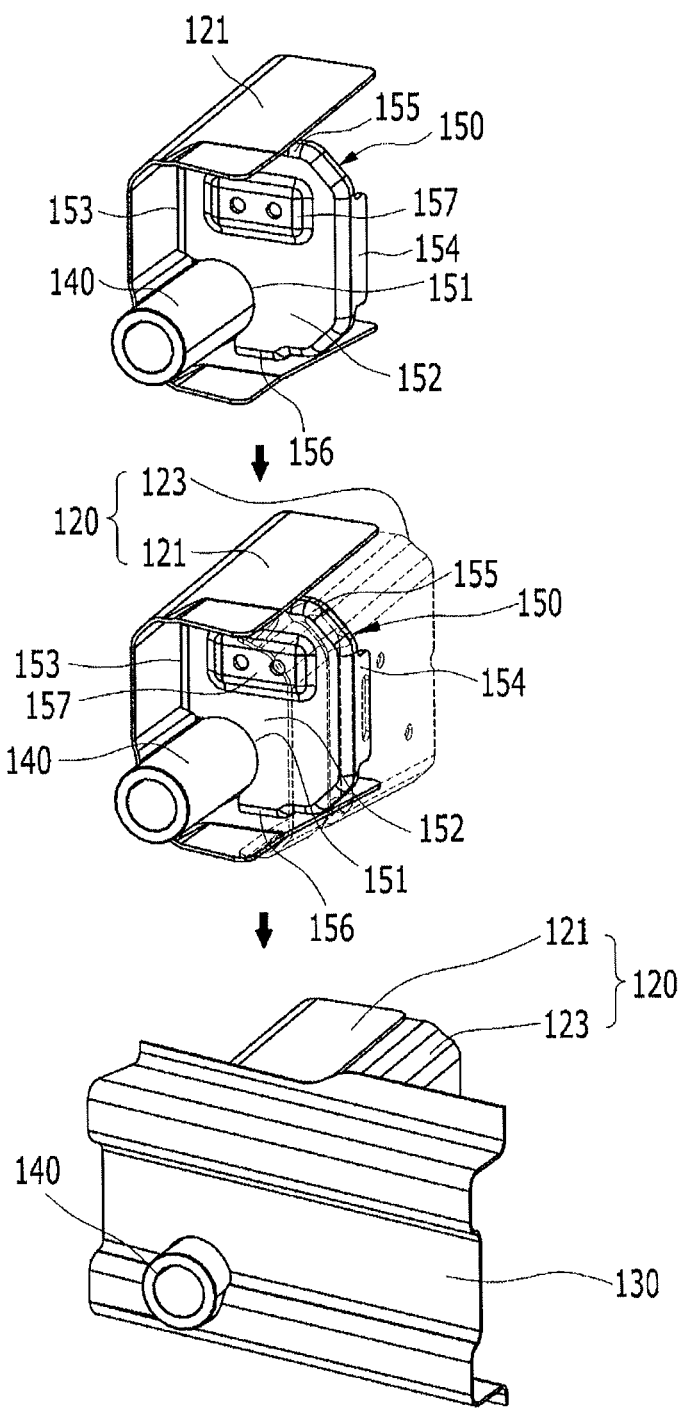
FIG. 5 is a mounting flowchart of the towing hook assembly for a vehicle according to the exemplary embodiment of the present invention.

FIG. 5 is a mounting flowchart of the towing hook assembly for a vehicle according to the exemplary embodiment of the present invention.

First, the towing hook pipe 140 is inserted into the first stay 121. Furthermore, a contact part between the pipe connector 151 of the supporting member 150 and the exterior circumference of the towing hook pipe 140 is coupled through $CO_2$ welding.

In addition, the first mounting surface 153, the third mounting surface 155, and the fourth mounting surface 156 of the stay connector 152 making contact with an interior circumference of the first stay 121 are sequentially $CO_2$ welded to be coupled with the interior circumference of the first stay 121.

Next, after the second stay 123 is fitted into an inner side of the first stay 121 so that the first stay 121 and the second stay 123 are coupled with each other, a contact part between the second mounting surface 154 of the stay connector 152 and the second stay 123 are coupled with each other by $CO_2$ welding.

As described above, in a state that engagement is completed, if the towing hook pipe 140 is fitted into an insertion hole 131 of the bumper beam 130, and a rear end of the bumper beam 130 are connected to a frond end of the stay 120, the assembling of the towing hook assembly 100 for a vehicle according to an exemplary embodiment of the present invention is completed.

Accordingly, the towing hook assembly 100 for a vehicle according to an exemplary embodiment of the present invention represents a sufficient strength for a load applied to the bumper beam 130 upon hauling of the vehicle by applying the supporting member 150 inside the stay 120, so that durable strength performance can be improved.

Further, the towing hook assembly 100 for a vehicle according to an exemplary embodiment of the present invention improves a transfer force of a collision load and an absorption force of collision energy by guiding stable transformation of the bumper beam and a stay upon heading-on of the vehicle so that a collision strength of the bumper beam can be improved.

An exemplary embodiment of the present invention is disclosed herein, but the present invention is not limited to the disclosed embodiments, but, on the contrary, is intended to cover various modifications and equivalent arrangements included within the appended claims and the detailed description and the accompanying drawing of the present invention.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A towing hook assembly for a vehicle comprising:
    a stay assembly connected to one of two opposing distal ends of a bumper beam, the stay assembly extending rearwardly from a rear side of the bumper beam and including a first U-shaped stay and a second U-shaped stay connected to the first stay;
    a towing hook pipe positioned within the stay assembly, adjacent one inner side of the stay assembly, and extending through an insertion hole in the bumper beam; and
    a supporting member connected to an exterior circumferential surface of the towing hook pipe, and connected to interior surfaces of upper, side and lower walls of the stay assembly, wherein the supporting member includes a polygonal shape having edges including a pipe connector edge having a half circle shape connected to the exterior circumferential surface of the towing hook pipe; and
    wherein the supporting member is a metal plate.

2. The towing hook assembly for the vehicle of claim 1, wherein the supporting member includes:
    a stay connector plate connected to interior surfaces of upper, side and lower walls of the stay assembly.

3. The towing hook assembly for the vehicle of claim 2, wherein the stay connector plate is connected to the interior surfaces of upper, side and lower walls of the first stay and an interior surface of a side wall of the second stay.

4. The towing hook assembly for the vehicle of claim 2, wherein first and second mounting surfaces are integrally formed on the stay connector plate, and the first and second mounting surfaces are connected to respective ones of the interior surfaces of the side walls of the first and second stays.

5. The towing hook assembly for the vehicle of claim 2, wherein third and fourth mounting surfaces are integrally formed on the stay connector plate, and the third and fourth mounting surfaces are connected to respective ones of the interior surfaces of the upper and lower walls of the first stay.

6. The towing hook assembly for the vehicle of claim 1, wherein the supporting member includes an elongated reinforcing groove protruding toward the bumper beam.

* * * * *